United States Patent [19]

Campain et al.

[11] Patent Number: 5,557,050

[45] Date of Patent: Sep. 17, 1996

[54] SYSTEM FOR METERING GAS SUPPLIED UNDER HIGH PRESSURE

[75] Inventors: Jean-Pierre Campain, Clamart; Jacques Fournier, Bretigny S/Orge; Sylvan Janssen, Neuilly s/Seine, all of France

[73] Assignee: Schlumberger Industries, Montrouge, France

[21] Appl. No.: 273,222

[22] Filed: Jul. 11, 1994

[30] Foreign Application Priority Data

Jul. 9, 1993 [FR] France ..................... 93 08591

[51] Int. Cl.⁶ ........................................ G01F 1/86
[52] U.S. Cl. ............................. 73/861.02; 73/199
[58] Field of Search ................ 73/861.02, 195, 73/196, 197, 198, 199, 861.61, 861.63

[56] References Cited

U.S. PATENT DOCUMENTS

| | | | |
|---|---|---|---|
| 2,862,387 | 12/1958 | Webster | 73/197 |
| 3,750,472 | 8/1973 | Ducousset . | |
| 4,131,015 | 10/1978 | Chawla et al. . | |
| 4,527,600 | 7/1985 | Fisher et al. | 73/861.02 |
| 4,706,492 | 11/1987 | Jones, Jr. et al. | 73/196 |
| 5,307,833 | 5/1994 | Stoy et al. | 73/199 |

FOREIGN PATENT DOCUMENTS

| | | |
|---|---|---|
| 0042432 | 3/1979 | European Pat. Off. . |
| 2400188 | 7/1981 | France . |
| 2076887 | 12/1981 | United Kingdom . |

Primary Examiner—Richard Chilcot
Assistant Examiner—Harshad Patel
Attorney, Agent, or Firm—Frishauf, Holtz, Goodman, Langer & Chick, P.C.

[57] ABSTRACT

A metering system, for metering a volume $V_o$ of compressed gas supplied under high pressure from a first tank to a second tank, includes a first duct for supplying the compressed gas from the first tank to the second tank, the first duct having a pressure regulator providing a relatively high driving pressure P, and a first nozzle having a section S with an inner diameter located downstream of the pressure regulator and providing a downstream pressure p therefrom, the pressure regulator being controlled by the downstream pressure p to maintain driving pressure P so that the downstream pressure p remains less than 0.95 P. A second duct branches at one end from the first duct between the pressure regulator and the first nozzle and includes a second nozzle having a section s with an inner diameter smaller than the inner diameter of the section S of the first nozzle. An outlet of the second nozzle is maintained under relatively low pressure conditions, and a volume meter is connected to the outlet of the second nozzle for metering under low pressure conditions a volume $v_o$ of gas flowing through the second duct. The volume $V_o$ which flows to the second tank under such low pressure conditions is determined by $V_o = v_o (S/s)$.

5 Claims, 1 Drawing Sheet

SYSTEM FOR METERING GAS SUPPLIED UNDER HIGH PRESSURE

BACKGROUND OF THE INVENTION

The present invention relates to a system for measuring a quantity of compressed gas supplied under high pressure from a first tank to a second tank.

Such systems are known in various forms and incorporated in numerous technical applications. In some such applications, there exists a need to bill for the quantity (i.e. volume) of gas supplied which requires not only a determination of the quantity of gas under the conditions of supply (e.g. temperature and pressure) but also that the quantity should be determined under uniform, standard conditions (also referred to herein as "normal") with respect to pressure and temperature regardless of the conditions of supply.

A type of gas meter is known which is provided with mechanical or electronic temperature and pressure correctors that serve to convert the quantity of gas, as supplied, to standard conditions, such as atmospheric pressure. This type of gas meter is commonly called a PTZ type, with the P and the T representing pressure and temperature, respectively, and the Z representing gas constituent variables which, for example, can vary from city to city. The correctors used in such PTZ meters are complex and expensive. The accuracy desired, such as for billing, determines the complexity of the prior art PTZ gas meters. In practice, it is necessary to choose between greater billing accuracy at the cost of using a sophisticated meter on the one hand, and using a simple meter at the expense of less accurate billing on the other hand.

BRIEF SUMMARY OF THE INVENTION

An object of the present invention is to provide a system for metering a quantity of gas which serves more particularly to measure directly, and without any need for gas-constituent and/or supply-conditions-related calculations, the volume that the supplied gas would occupy under standard conditions of temperature and pressure, thus making simple billing possible just as is already the case for a customer receiving gas that is supplied at atmospheric pressure.

This and other objects of the invention are attained by a system for metering a quantity of gas supplied under high pressure from a first tank via a first duct to a second tank, wherein the first tank also feeds a second duct which branches from the first duct and which includes means for measuring the quantity of supplied gas converted to standard conditions.

BRIEF DESCRIPTION OF THE DRAWING

The invention will be better understood when reading the description with reference to the only figure which is a circuit configured in accordance with the invention.

DETAILED DESCRIPTION OF THE INVENTION

Figure 1:
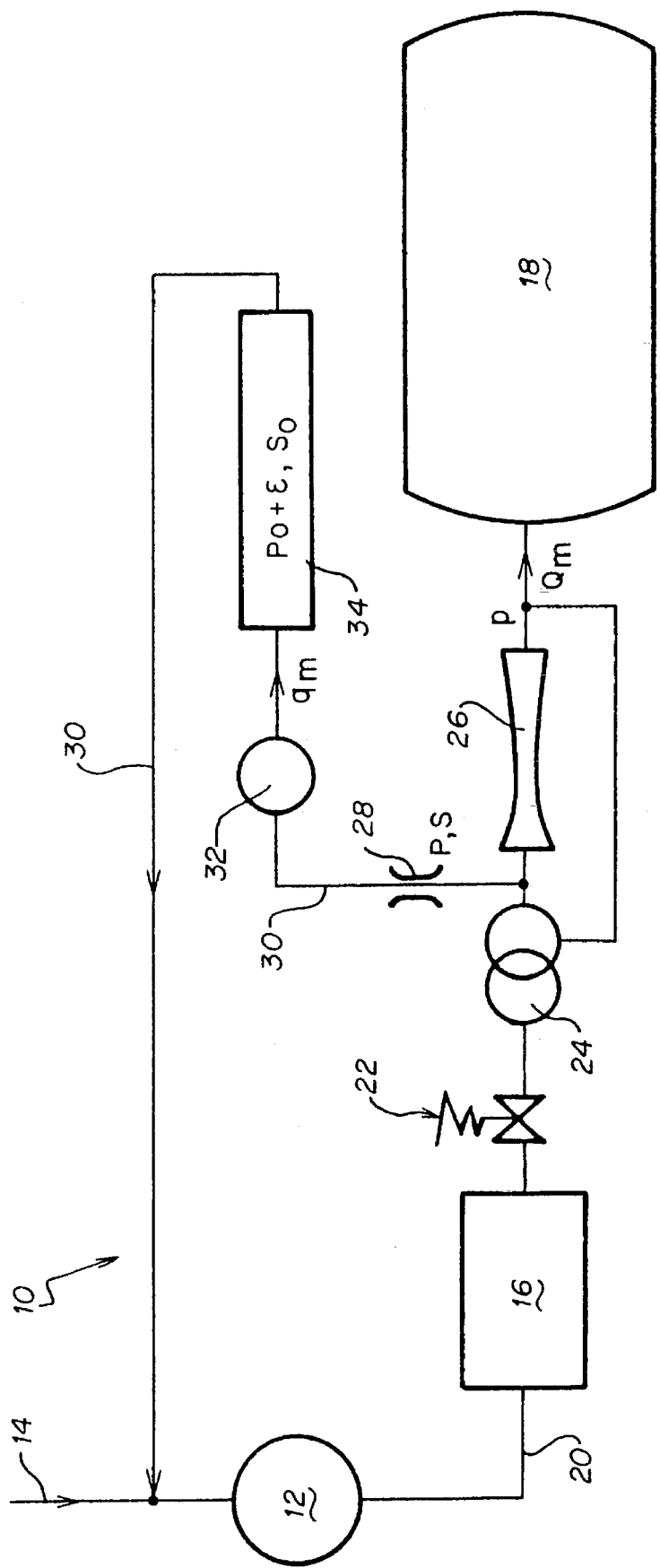

In a preferred embodiment, the system of the invention includes the following elements. A first Venturi nozzle operating under sonic conditions (i.e. the downstream pressure is less than about 0.95× the upstream driving pressure) delivers a mass flow rate for a gas of given composition that depends solely on the driving pressure and the volume flow rate that corresponds thereto under the conditions of supply. The nozzle output feeds the tank to be filled.

A second Venturi nozzle, also operating under sonic conditions, is fed with gas at the same driving pressure, but it delivers the gas to a tank maintained at atmospheric pressure to provide a mass flow rate proportional to that of the first Venturi nozzle. The flow rate through the second nozzle is measured, after expansion and at atmospheric pressure, as a normal volume flow rate, which is therefore capable of being measured using a conventional, simple meter (such as a residential meter) placed downstream of the second nozzle.

Turning now to the invention as depicted in the only drawing, system 10 is shown to be a circuit that supplies a hydrocarbon fuel gas to a vehicle tank, for example. Such an arrangement would be found in a service station. A compressor 12 compresses gas coming from an external tank (not shown) via a low pressure duct 14 and maintains a high pressure, of the order of 300 bars for example, in a first tank 16 part of the contents of which are intended to fill a second tank 18, e.g. a car tank.

Such a circuit includes a first duct 20, an on-off valve 22 and a regulator 24 which maintains a pressure P upstream from a throat which is preferably of a first Venturi nozzle 26. Nozzle 26 is preferably operating under sonic conditions such that the pressure p downstream therefrom remains less than 0.95×P, and preferably less than 0.9×P. The regulator 24 is conventional and well known, and is controlled by feedback of the downstream pressure p.

Under such conditions, the mass flow rate $Q_m$ is given by:

$$Q_m = S \times f(\gamma) \times \sqrt{(P \times \rho)}$$

where:
S=inner diameter of the section at the throat of nozzle 26
$\gamma$=thermal capacity of the gas
P=upstream pressure
$\rho$=upstream density and the mass M of gas supplied to the tank during time t is given by:

$$M = S \times \int_o^t f(\gamma) \times \sqrt{(P \times \rho)} \; dt = V_o \times \rho_o$$

where:
$V_o$ represents the volume that the mass M of gas would occupy under the normal conditions of temperature and pressure (e.g. atmospheric pressure) that determine its standard density $\rho_o$.

A second duct 30 that branches from the first duct 20 downstream from the regulator 24 includes a second throat 28, preferably a second Venturi nozzle of throat section inner diameter s, likewise operating under sonic conditions and fed with the same regulated driving pressure P, and it delivers gas via a gas meter 32 to a third tank 34 which is maintained at atmospheric pressure $p_o$.

The mass m of gas delivered during the same time t used for determining M is given by:

$$m = s \times f(\gamma) \times \sqrt{(P \times \rho)} \; dt = v_o \times \rho_o$$

where
$V_o$ is the volume metered by the meter 32, thus giving:

$$V_o = v_o \times (S/s)$$

regardless of the nature (e.g. composition) and the state (i.e. under the supply conditions) of the gas.

The standard volume $V_o$ of gas delivered under pressure through the large nozzle 26 is measured by volume-measuring meter 32 connected to the outlet of the small nozzle 28, but at a ratio of s/S. The meter 32 operates under "normal" conditions. Thus, in order to derive $V_o$, the $v_o$ output of meter 32 must be multiplied by S/s which is a simple calculation preferably performed electrically. A key point regarding such calculation is that it is not in any way related to the variable conditions of supply and/or the constituents of the gas, but rather to the predetermined physical dimensions of the measurement apparatus. The ratio of the mass flow rates from the two nozzles (and consequently the ratio of their normal volumes) depends only on the sections of their throats. This is in contrast to the PTZ type of gas meter which performs complex corrections to compensate for variables involving the gas constituents and/or the supply conditions.

A pressure regulator (not shown) maintains atmospheric pressure in the third tank 34 and the excess gas $q_m$ that has been used for metering purposes is returned at a point upstream of the compressor 12.

The first Venturi nozzle 26 may be of the type used to provide flows at conventional rates for the particular applications involved. The diameter of its throat of section S is of the order of 2 mm to 3 mm. Under such circumstances, the second Venturi nozzle 28 is preferably of the same type, but having a throat of section s with a diameter of about 0.1 mm to 0.2 mm only. It may be manufactured using various known techniques such as electroerosion or laser beam machining, and it is similar to a die of the kind used for drawing fine wires.

Nozzle 28 could be replaced by a simple hole of similar size formed through a thin wall and acting as a diaphragm. Sonic conditions in the nozzle that delivers gas to a tank at atmospheric pressure may be obtained merely by means of such a diaphragm, since the ratio of upstream and downstream pressures is always very high and there is no danger of cut off.

Although the invention has been explained in a service station application, it can be used in numerous similar applications in which gas is supplied under high pressure and in which the flow rate needs to be reduced to standard conditions. Also, various modifications of the specific circuit disclosed herein will readily occur to anyone with ordinary skill in the art. All such changes are intended to fall within the scope of the present invention as defined by the following claims.

We claim:

1. A metering system for metering a volume of compressed gas supplied under high pressure from a first tank to a second tank, said metering system comprising:

a first duct for supplying said compressed gas from said first tank to said second tank, said first duct comprising:

a pressure regulator providing a high driving pressure P, and a first nozzle having a section with an inner diameters located downstream of said pressure regulator and providing a pressure p downstream therefrom being is less than 0.95 P;

a second duct branching at an inlet end thereof from said first duct between said pressure regulator and said first nozzle, and comprising:

a second nozzle having a section with an inner diameters smaller than the inner diameter of said section S of said first nozzle, an outlet of said second nozzle being maintained at a predetermined low pressure, and a volume meter connected to said outlet of said second nozzle for metering a volume $v_o$ of gas flowing through said second duct at said low pressure; and means for calculating a volume $V_o$ at said low pressure of the compressed gas supplied to the second tank by:

$$V_o = v_o (S/s).$$

2. A metering system according to claim 1, wherein said pressure p is less than 0.90 P.

3. A metering system according to claim 1, further comprising feedback means to said pressure regulator for controlling said pressure P in response to said downstream pressure p.

4. A metering system according to claim 1, further comprising means to maintain said predetermined low pressure downstream of said second nozzle.

5. A metering system according to claim 1, wherein pressure at the outlet of said second nozzle is less than 0.95 P.

* * * * *